Feb. 17, 1970  W. L. LECHNER  3,495,768
FLUIDICALLY CONTROLLED, ELECTRICALLY OPERATED
UNLOADER VALVE CONTROL SYSTEM

Filed Feb. 25, 1969  2 Sheets-Sheet 1

WALTER L. LECHNER
INVENTOR
BY Daniel H. Bobis
atty

WALTER L. LECHNER
*INVENTOR.*

BY Daniel H. Bobis
*Atty.*

United States Patent Office 3,495,768
Patented Feb. 17, 1970

3,495,768
FLUIDICALLY CONTROLLED, ELECTRICALLY OPERATED UNLOADER VALVE CONTROL SYSTEM
Walter L. Lechner, New Providence, N.J., assignor to Worthington Corporation, Harrison, N.J., a corporation of Delaware
Filed Feb. 25, 1969, Ser. No. 802,162
Int. Cl. F04b 49/02; G05d 16/20; F15c 1/14
U.S. Cl. 230—24                                     17 Claims

ABSTRACT OF THE DISCLOSURE

A fluidically controlled, electrically operated unloader valve control system is provided and includes fluidic control signal generation means and fluidically controlled, electrical switch means which are operable by said fluidic control signals to effect the loading and unloading of a fluid machine. Said fluidic control signal generation means are cooperatively associated with the fluid machine crankshaft and fluid machine condition responsive means which determine when loading and unloading are to take place, and are operative in response to operation of the latter and rotation of said crankshaft to generate said fluidic control signals. Said fluidically controlled, electrical switch means comprise bistable fluidic elements and positive action, switch actuation means cooperatively associated therewith, and said bistable fluidic elements are operative, in response to changes in said fluidic control signals, to operate said switch actuation means to change the condition of said electrical switch means and effect fluid machine loading and unloading. An extremely fast response time is provided by the system as a result, in large part, of the extremely fast response times of the respective bistable fluidic elements.

BACKGROUND OF THE INVENTION

This invention relates to a new and improved unloader valve control system and, more particularly, to a fluidically controlled, electrically operated unloader valve control system with an extremely fast response time.

Although unloader valve control systems are well known in the prior art it may be understood that, in many instances, the response times thereof are too slow to enable fluid machine operation in the higher speed ranges of which the latter may be capable to thus unnecessarily limit the useful work which may be performed by said fluid machines per unit of operating time. More specifically, it may be understood that for fluid machines in the nature of reciprocating pumps or compressors, the loading or unloading function must be performed within the time required for one-half of a pump or compressor crankshaft revolution, whereby it is believed made clear that the longer the time required for the performance of such loading or unloading function, the lower the maximum speed of operation of the pump or compressor must be.

In addition, it may be understood that many of the unloader valve control systems of the prior art are completely lacking in versatility in that, for example, if designed for operation with a four cylinder reciprocating pump or compressor, the said prior art unloader valve control systems cannot be satisfactorily adapted for use with reciprocating pumps or compressors having, for example, six cylinders, without very substantial unloader valve control system modification.

Too, the prior art unloader valve control systems for use with multi-cylinder or multi-stage fluid machines in the nature of pumps or compressors will, in many instances, be found to be unduly complex and/or lacking in reliability under demanding operational conditions or after prolonged usage thereof.

OBJECTS OF THE INVENTION

It is, accordingly, an object of this invention to provide a new and improved unloader valve control system having an extremely fast response time.

Another object of this invention is the provision of a new and improved unloader valve control system which embodies significant versatility in that the same may be readily and conveniently adapted for operation with fluid machines in the nature of pumps or compressors having widely varied numbers of cylinders or stages.

A further object of this invention is the provision of a new and improved unloader valve control system which is of somewhat reduced complexity as compared with similar systems of the prior art, and one which provides for long periods of satisfactory, maintenance-free operation under demanding operational conditions.

A still further object of the invention is the provision of a new and improved unloader valve control system which is particularly, though by no means exclusively, adapted for use in the control of the unloader valves of reciprocating pumps.

SUMMARY OF THE INVENTION

As currently preferred, the new and improved unloader valve control system of the invention comprises a plurality of electrical switches, each of which is controlled by a bistable fluidic element and is operable in turn to energize or deenergize the control solenoid of an unloader valve of a fluid machine. Fluidic control signal generation means are provided and comprise cooperatively associated multi-position valve means and fluidic control signal formulation means, respectively. Said valve means are effective, in response to the operation of sensing means which sense an operational condition of the fluid machine upon which the fluid machine loading and unloading functions are to be predicated, to direct the admission of pressurized fluid to said fluidic control signal formulation means and the latter are effective, in response to the revolution of the fluid machine crankshaft, to formulate fluidic control signals for supply to said bistable fluidic elements with attendant control of said electrical switches and operation of the fluid machine unloader valves.

The fluidic control signal generation means are arranged so that with said multi-position valve means in a first position thereof, first fluidic control signals will be generated, while second fluidic control signals will be generated with said multi-position valve means in a second position thereof. In like manner, the bistable fluidic elements and electrical switches are respectively arranged so that, with the former switched to first states thereof in response to said first fluidic control signals, the electrical switches will be effective to unload said fluid machine, while with said bistable fluidic elements switched to second states thereof in response to said second fluidic control signals, said electrical switches will be effective to load said fluid machine. The extremely fast response time of the bistable fluidic elements in switching between the respective states thereof in response to changes in said fluidic control signals provides for an extremely fast overall unloader valve control system response time.

BRIEF DESCRIPTION OF THE DRAWINGS

The above and other objects and advantages of this invention are believed made clear by the following detailed description thereof taken in conjunction with the accompanying drawings wherein.

DETAILED DESCRIPTION OF THE INVENTION

Figures 1, 2:
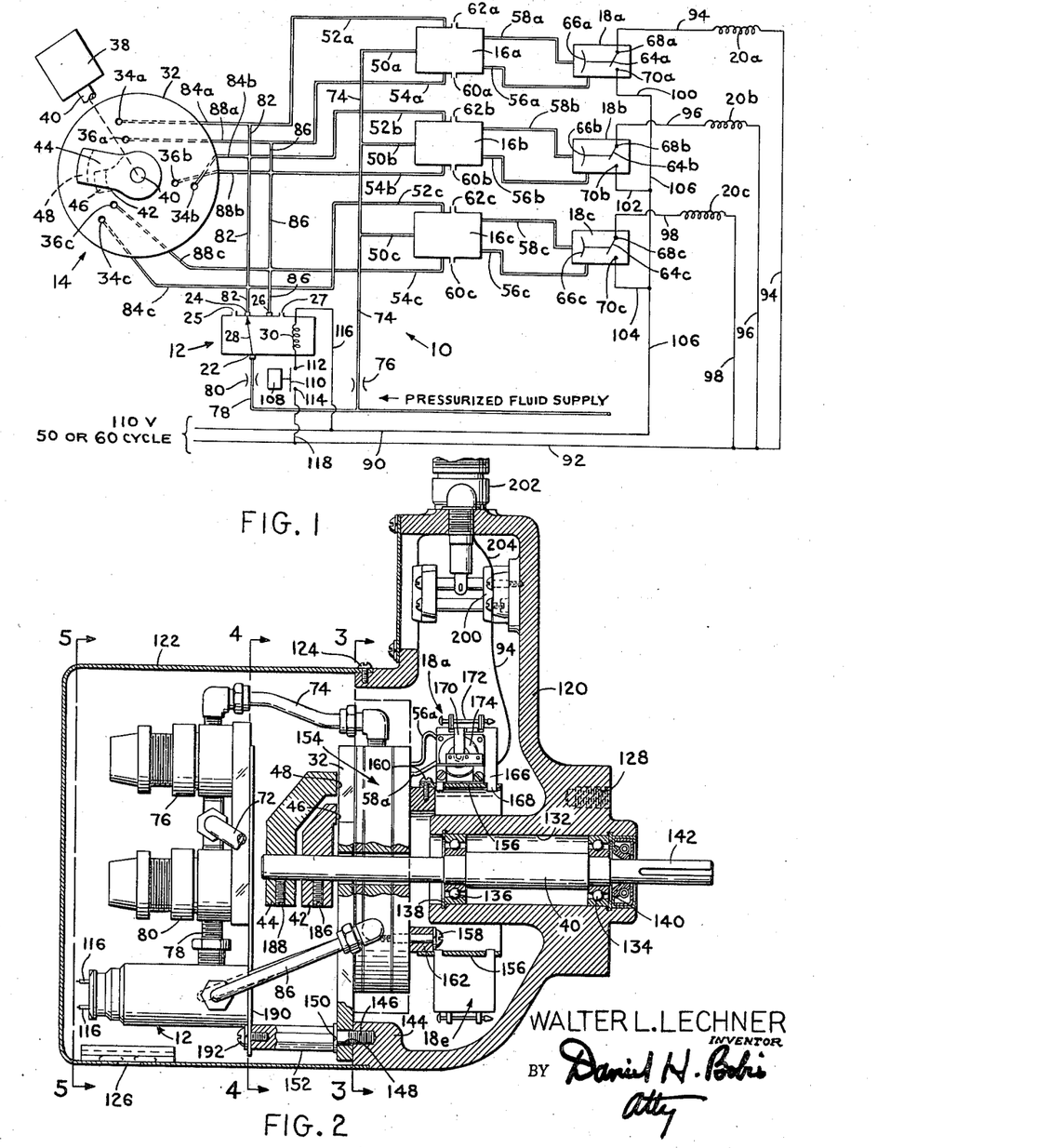
FIGURE 1 is a generally schematic depiction of a new and improved unloader valve control system constructed in accordance with the teachings of this invention.
FIGURE 2 is side elevation, with parts cut-away and portions in cross-section, of the unloader control vale system of the invention as applied to the control of the unloader valves of a vertical plunger type reciprocating pump.

Referring now to FIGURE 1, the unloader valve control system of the invention may be seen to comprise fluidic control signal generation means as indicated generally at 10 and including electrically operated, multi-position control valve means 12 and fluidic control signal formulation means 14. Bistable fluidic amplifier elements are indicated at 16a, 16b and 16c, respectively, while electrical switches to be controlled by said fluidic elements are indicated at 18a, 18b and 18c, respectively.

As depicted in FIGURE 1, it may be understood that the unloader valve control system of the invention is designed for the control of the solenoid operated unloader valves of a fluid machine in the nature of a three cylinder or triplex reciprocating pump or compressor which comprises unloader valve control solenoids as indicated at 20a, 20b and 20c, respectively, each of which is of course effective to control the loading and unloading of the particular pump or compressor cylinder with which the same is associated.

The electrically operated, multi-position valve means 12 comprise an inlet port 22 and outlet ports 24 and 26, respectively. A fluid directing member is schematically indicated at 28 and may be understood to be moveable, under the control of a valve control solenoid 30, to connect either of inlet port 22 and outlet port 24, as depicted, or to alternatively connect inlet port 22 and outlet port 26. For purposes described in greater detail hereinbelow, it may be understood that the multi-position valve means 12 are arranged so that fluid directing member 28 will connect inlet port 22 and outlet port 24 only when control solenoid 30 is de-energized and will, conversely, connect inlet port 22 and outlet port 26 only when the said control solenoid is energized.

Further included in the multi-position valve means 12 are vent means 25 which are effective to vent outlet port 24 to atmosphere only when fluid directing member 28 connects inlet port 22 and outlet port 26; and vent means 27 which are effective to vent outlet port 26 to atmosphere only when fluid directing member 28 connects inlet port 22 and outlet port 24.

The fluidic control signal formulation means 14 comprise a nozzle block 32 which includes inner and outer groups of equally spaced nozzles or orifices extending through the depicted face thereof into communication with the atmosphere. More specifically, and for use in the unloader valve control of a triplex or three cylinder pump or compressor, it may be seen that the outer group of nozzles comprises nozzles 34a, 34b and 34c formed as shown at 120° intervals in the depicted nozzle block face, while the inner group of nozzles comprises nozzles 36a, 36b and 36c respectively formed as shown radially inward of the outer nozzles with substantially the same 120° interval therebetween.

A fluid machine which, in this instance, might be a triplex or three cylinder pump or compressor as set forth hereinabove, is indicated schematically at 38 and comprises a crankshaft or crankshaft extension 40 extending therefrom as indicated through an aperture provided therefor in the nozzle block 32.

Cams 42 and 44 are fixedly secured to the crankshaft 40 so as to be rotatable therewith to sweep the depicted face of the nozzle block 32. Cam 42 comprises an inwardly directed projection or face 46 formed thereon and effective for each complete revolution of the crankshaft 40 to briefly cover in turn each of the nozzles 36a, 36b and 36c of the inner nozzle group to thus briefly interrupt the fluid flow communication of the said nozzles with the atmosphere. In like manner, cam 44 comprises an inwardly directed projection or face 48 formed thereon and effective for each complete revolution of the crankshaft 40 to briefly cover in turn each of the nozzles 34a, 34b and 34c of the outer nozzle group to thus briefly interrupt the fluid flow communication of these outer nozzles with the atmosphere.

For reasons made clearer hereinbelow, it may be understood that the revolution of cam 42 across the depicted face of the nozzle block 32 will be effective, in conjunction with operation of multi-position valve means 12, to load the fluid machine 38, while the revolution of cam 44 across the depicted face of the nozzle block 32 will be effective, in conjunction with the operation of the multi-position valve means 12, to unload the said fluid machine.

Each of the bistable fluidic elements 16a, 16b and 16c is operable, as believed well understood by those skilled in this art, in a manner analogous to that of a flip-flop element in an electrical circuit. More specifically, and taking bistable fluidic element 16a for example, it may be understood that the same includes a power signal input conduit 50a, first and second control signal input conduits as indicated at 52a and 54a, first and second control signal output conduits as indicated at 56a and 58a, and first and second vent means cooperatively associated with said outputs and indicated respectively at 60a and 62a.

Briefly described, in operation with a power signal input on conduit 50a, a control signal input on conduit 52a will effect a control signal output on conduit 56a, while a control signal input on conduit 54a under like conditions will effect a control signal output on conduit 58a. In addition, in absence of a control signal input on conduit 52a and with a control signal input on conduit 54a, control signal output conduit 56a will be vented to atmosphere through vent means 60a. In like manner, control signal output conduit 58a will be vented to atmosphere through vent means 62a in the absence of a control signal input on conduit 54a and with a control signal input on conduit 52a.

Although not described in detail herein, it may be understood that each of bistable fluidic elements 16b and 16c is of substantially the same construction and manner of operation as bistable fluidic element 16a, whereby the respective power and control signal input and output conduits and the vent means of elements 16b and 16c may readily be seen to bear corresponding reference numeral and letter suffix indicia.

Preferably, and for reasons made clearer hereinbelow, each of the bistable fluidic elements 16a, 16b and 16c is of the "preferred" type so that almost immediately upon the application of a power signal input thereto, and prior to the application of any control signal inputs thereto, assuming, of course, that the application of the power signal precedes the application of the control signal, the power fluid will take a preferred path through the bistable fluidic element to provide a control signal output on a preferred output conduit. As utilized herein, and if of this "preferred" type, it may be understood that bistable fluidic elements 16a, 16b and 16c will be arranged to initially provide control signal outputs on conduits 56a, 56b and 56c, respectively, under conditions as described hereinabove.

Each of the fluidically controlled, electrical switches 18a, 18b and 18c is preferably, though not necessarily, of the positive, snap action type as disclosed in detail in the copending application of George E. Schaller entitled "Positive Action, Fluidically Controlled Electrical Switch," Ser. No. 802,097, filed Feb. 25, 1969, and assigned to the assignee hereof. As disclosed therein, and as depicted and described in somewhat greater detail hereinbelow, it may be understood that each of switches 18a, 18b and 18c is of substantially the same construction in comprising, as regards switch 18a for example, a single switch pole as schematically indicated at 64a, and fluidically controlled switch actuation means as schematically indicated at 66a and effective to move said switch pole between the open and closed positions thereof relative to switch contacts 68a and 70a in response to fluidic control signals applied to said switch actuation means from bistable fluidic element 16a on connected control signal output conduits 56a and 58a.

To this effect, fluidically controlled electrical switch 18a may be understood to be double acting in comprising first and second pressure responsive means, one of which is operative, upon the expansion thereof by a first pressurized fluid switch input, to positively change the switch from the "off" condition thereof to the "on" condition thereof and positively maintain the switch in the "on" condition. In like manner, the other of said pressure responsive means is operative, upon the expansion thereof by a second pressurized fluid switch input, to positively change the switch from the "on" condition thereof to the "off" condition thereof and positively maintain the switch in the latter condition. As seen in FIGURE 1 for switch 18a, it may be understood that said first pressurized fluid switch input will be provided by a control signal output on control signal output conduit 58a, while said second pressurized fluid switch input will be provided by a control signal output on control signal output conduit 56a.

More specifically, and again taking for example bistable fluidic element 16a and positive action switch 18a, it may be understood that with a power signal input on conduit 50a and a control signal input on conduit 52a, the resultant provision of control signal output on conduit 56a will be effective to positively move switch pole 64a to the depicted open position thereof and positively maintain the same in said position to open switch 18a. Conversely, with a power signal input on conduit 50a and a control signal input on conduit 54a, the resultant provision of a control signal output on conduit 58a will be effective to positively move switch pole 64a to bridge switch contacts 68a and 70a and positively maintain the same in such position to close switch 18a.

In a manner believed clear to those skilled in this art, it may be understood that once the provision of an output control signal on, for example, output conduit 56a of bistable fluidic element 16a is commenced in response to the provision of an input on conduit 52a, the said output control signal will continue to be provided—assuming of course the continuance of the power signal on conduit 50a—despite the discontinuance of the input on conduit 52a until such time as the bistable fluidic element is "switched" by the application of an input on conduit 54a. In like manner, the provision of an output control signal on conduit 58a in response to an input on conduit 54a will continue despite the discontinuance of the latter until oppositely directed bistable fluidic element "switching" is effected. As a result, it may be understood that once positive action, fluidically controlled switch 18a is placed in either of the open or closed conditions thereof, the said switch will be positively maintained in the said condition until such time as "switching" of the bistable fluidic element 16a is effected with attendant change in electrical switch condition.

Although not specifically described herein, it may be understood that the construction and manner of operation of each of positive action, fluidically controlled electrical switches 18b and 18c, and the respective operational relationships thereof with the bistable fluidic elements 16b and 16c, are the same as those described hereinabove with regard to electrical switch 18a, whereby the respective switch pole, actuation means and contacts of electrical switches 18b and 18c may readily be seen to bear corresponding reference numeral and letter suffix indicia.

A pressurized fluid supply conduit is indicated at 72 and may be understood to be effective to supply pressurized fluid at proper operating pressures to the respective multi-position valve means 12 and bistable fluidic elements 16a, 16b and 16c. More specifically, a branch conduit 74, including pressure regulator means 76 disposed therein for obvious purpose, extends as shown from supply conduit 72 into communication with the respective bistable fluidic element power input conduits 50a, 50b and 50c; while a branch conduit 78, including pressure regulator means 80, extends as shown from supply conduit 72 into communication with valve inlet port 22.

A branch conduit 82 extends as shown from valve outlet port 24 into communication with each of control signal input conduits 52a, 52b and 52c; while connecting conduits 84a, 84b and 84c extend respectively as shown from the nozzles 34a, 34b and 34c of the outer nozzle group into communication with the branch conduit 82 and the respective control signal input conduits 52a, 52b and 52c in that order. In like manner, a branch conduit 86 extends as shown into communication with each of the control signal input conduits 54a, 54b and 54c; while connecting conduits 88a, 88b and 88c extend respectively as shown from the nozzles 36a, 36b and 36c of the inner nozzle group into communication with the branch conduit 86 and the respective control signal input conduits 54a, 54b and 54c.

Electrical power input lines 90 and 92 are provided to furnish electrical power as indicated to the respective unloader valve control solenoids 20a, 20b and 20c, and the multi-position valve means control solenoid 30. More specifically, the unloader valve control solenoids 20a, 20b and 20c are respectively connected as shown in branch lines 94, 96 and 98 which are in turn connected between the power input line 92 and the respective switch contacts 68a, 68b and 68c. In like manner, the switch contacts 70a, 70b and 70c are connected as shown to the electrical power input line 90 via respective branch lines 100, 102 and 104, and common branch line 106. By this arrangement it is believed made clear that the respective unloader valve control solenoids 20a, 20b and 20c will be connected across the power input lines 90 and 92, with attendant energization thereof, only upon the closure of the respective switches 18a, 18b and 18c.

A condition responsive switch is indicated at 108 and comprises a single pole 110 which is operable to bridge switch contacts 112 and 114 when the switch is closed. Switch contact 112 is connected as shown to input line 90 by branch line 116 within which is connected the valve control solenoid 30, while switch contact 114 is connected as shown to input line 92 by branch line 118, whereby is believed made clear that closure of the condition responsive switch 108 will result in the energization of the valve control solenoid 30.

As utilized herein, condition responsive switch 108 is designed to operate in response to the condition or conditions upon which the loading and unloading of the fluid machine 38 is to be predicated. More specifically, it may be understood that such conditions might include, for example, fluid machine discharge pressure, discharge fluid flow rate, fluid machine oil temperature or pressure, the pressure in receiver means associated with the fluid machine, and/or the pressure at the point of utilization of the pressurized fluid provided by the fluid machine 38.

Regardless of the nature of the condition to which the condition responsive switch 108 is to respond, it may be understood that the same is preferably arranged to be in the depicted open position thereof, in response to the relevant fluid machine condition or conditions which dictate fluid machine unloading, to effect the de-energization of the valve control solenoid 30 with attendant disposition of the fluid directing member 28 in the depicted position thereof. Conversely, it may be understood that condition responsive switch 108 is arranged to be in the closed position thereof, in response to the relevant fluid machine condition or conditions which dictate fluid machine loading, to effect the energization of valve control solenoid 30 with attendant disposition of the fluid directing member 28 in the position thereof to connect valve inlet port 22 and valve outlet port 26.

OPERATION

In operation, with each of the respective system switches in the depicted open position thereof, and assuming each of the bistable fluidic elements to be "switched" to the state thereof wherein control signal outputs are provided therefrom on the respective control signal output conduits 56a, 56b and 56c, the fluid machine 38 will be operating in the unloaded condition thereof due to the attendant de-energization of the respective unloader valve control solenoids 20a, 20b and 20c.

More specifically, with condition responsive switch 108 in the open position thereof as depicted, it may be understood that the control solenoid 30 of the multi-position valve means 12 will be de-energized whereby the fluid directing member 28 will be disposed as depicted to connect valve inlet port 22 to valve outlet port 24 with attendant connection thereby of branch conduits 78 and 82. Accordingly, pressurized fluid will be supplied from supply conduit 72 to branch conduit 82.

With the fluid directing member 28 thusly disposed, no pressurized fluid will be supplied to branch conduit 86, and it may be understood that the same will be maintained at substantially ambient or atmospheric pressure through the operation of the vent means 27 of the valve 12. At this juncture it is believed clear that, as is always the case upon pressurization of supply line 72, pressurized fluid will be applied as a power signal input to each of the bistable fluidic elements through branch conduit 74 and the respective power signal input conduits 50a, 50b and 50c.

With the respective cams 42 and 44 rotating in the counterclockwise direction through the depicted positions thereof, each of the nozzles 36a, 36b and 36c of the inner nozzle group, and 34a, 34b and 34c of the outer nozzle group, will be uncovered, whereby all conduits associated therewith will be vented to atmosphere through the said nozzles to prevent the formulation of control signals for application to the respective bistable fluidic elements. More specifically, and with regard to each of branch conduit 86 and connecting conduits 88a, 88b and 88c, it may be understood that since no pressurized fluid is, in any event, at such time being supplied thereto, no control signals could be formulated therein for application on connected control siynal input conduits 54a, 54b and 54c to the respective bistable fluidic elements.

With regard, however, to branch conduit 82 and connecting conduits 84a, 84b and 84c, it may be understood that although pressurized fluid is being supplied to the former from valve outlet port 24, the said connecting conduits will vent the same to atmosphere through the uncovered nozzles 34a, 34b and 34c to at this point also prevent the formulation and application of control signal inputs on connected control signal input conduits 52a, 52b and 52c to the respective bistable fluidic elements.

Revolution of the cams 42 and 44 to the respective positions thereof wherein the cam face 46 covers nozzle 36c and the cam face 48 covers nozzle 34c will result, however, in the blocking of the said nozzles for a finite time, the duration of which will of course be commensurate with the respective cam face and nozzle dimensions and the speed of rotation of the fluid machine crankshaft 40.

Control signal formulation will not result from this blockage of nozzle 36c since the branch conduit 86 is not at this point being supplied with pressurized fluid from the supply line 72 and is, in any event, vented to atmosphere through valve vent means 27.

Control signal formulation will, however, result from this blockage of nozzle 34c in that the flow of pressurized fluid therethrough from connecting conduit 84c will be terminated to result in the formulation of a pulse and the subsequent application thereof as a control signal input to bistable fluidic element 16c on connected control signal input conduit 52c.

If, as discussed hereinabove, it is assumed that bistable fluidic element 16c is already in the state thereof wherein a control signal output is being provided on control signal output conduit 56c, it may be understood that this particular control signal input will serve no useful function other than to perhaps insure the maintenance of the bistable fluidic element 16c in the said condition. If, however, bistable fluidic element 16c had been in the other state thereof as discussed in greater detail hereinbelow, it may be understood that this particular control signal input would, of course, be effective to switch the said element.

Continued revolution of the respective cams 42 and 44 in the counterclockwise direction to in turn cover and block nozzles 36b and 34b, and 36a and 34a, will, with regard to nozzles 36b and 36a, be ineffective due to the lack of pressurization of branch conduit 86 as discussed above, to formulate control signals in connecting conduits 88b and 88a for application on control signal input conduits 54b and 54a; but will be effective with regard to nozzles 34b and 34a, due to the supply of pressurized fluid to branch conduit 82, to sequentially generate pulses in connecting conduits 84b and 84a for application as control signal inputs on control signal input conduits 52b and 52a to the respective bistable fluidic elements 16b and 16a.

Operation in this manner would continue, for so long as condition responsive switch 108 remains open, with each revolution of crankshaft 40 and cams 42 and 44 functioning as described to provide sequential control signal inputs on control signal input conduits 52a, 52b and 52c, and the provided bistable fluidic control signal outputs on control signal output conduits 56a, 56b and 56c functioning to maintain each of the fluidically controlled, positive action electrical switches 18a, 18b and 18c open with attendant maintenance of the respective unloader valve control solenoids 20a, 20b and 20c in the de-energized states thereof. Thus, although under the condition of operation, as described in this juncture, the formulated and applied control signal inputs may not per se perform a specific function, it is believed clear that the overall function of the system of the invention under such conditions would be to positively maintain the fluid machine 38 unloaded.

Operation in this manner would continue until sensing by the condition responsive switch 108 of a condition or conditions dictating the loading of the fluid machine 38. As this occurred, the switch 108 would close to effect energization of the valve control solenoid 30 which would, in turn, function to move fluid directing member 28 of the multi-position valve means 12 from the depicted position of the former to the position thereof wherein valve inlet port 22 would be connected to valve outlet port 26, and the valve outlet port 24 now vented to ambient or atmospheric pressure through valve vent means 25.

As a result of this change in valve condition, it may be understood that branch conduit 86 would now be supplied with pressurized fluid from supply conduit 72 and connected branch conduit 78, while the supply of pressurized fluid to the now valve-vented branch conduit 82 would, of course, be abruptly terminated.

If it is assumed that this shifting of multi-position valve means 12 occurred with the respective cams moving through a position intermediate any two nozzle pairs, as for example nozzle pair 34b and 36b and nozzle pair 34a and 36a, it may be understood that the said valve means shifting would have no immediate effect upon the operation of the system. More specifically, it is believed clear that although the supply of pressurized fluid has now been shifted from the now valve-vented branch conduit 82 and connecting conduits 84a, 84b and 84c to the branch conduit 86 and connecting conduits 88a, 88b and 88c, the fact that at this point each of the nozzles 34a, 34b and 34c, and 36a, 36b and 36c are open to atmosphere will nonetheless prevent the formulation and application of any input control signals to any of the bistable fluidic devices.

Continued rotation of the cams 42 and 44 in the counterclockwise direction will, however, shortly result in the covering and blockage of the respective nozzles 36a and 34a by the respective cam faces 46 and 48 with the former occurring somewhat before the latter as a result of the slight advance afforded cam 42 for purposes described in detail hereinbelow.

This blockage of the nozzle 36a by the cam face 46 will result in the formulation of a pulse in connecting conduit 88a and the application thereof as a control signal input to bistable fluidic element 16a on connected, control signal input conduit 54a. This will result in the extremely rapid switching of the bistable fluidic element 16a from the state thereof in which an output control signal has been provided on control signal output conduit 56a to the state thereof wherein an output control signal will commence to be provided on control signal output conduit 58a, and it may be understood that this switching of the bistable fluidic element 16a will be accompanied by the venting of control signal output conduit 56a to atmosphere.

The commencement of the control signal output on conduit 58a, and the termination of the control signal output on conduit 56a with attendant venting of the latter to atmosphere, will result in the extremely rapid, positive snap action of the switch actuation means 66a to close switch 18a and effect energization of unloader valve control solenoid 20a to load the particular fluid machine cylinder with which the same is associated.

Assuming switch 18a to be of the positive action, fluidically controlled type referred to hereinabove, it may be understood that the venting of control signal output conduit 56a concomitantly with the termination of the provision of the control signal output thereon will greatly facilitate switch operation by providing an exhaust path to atmosphere for the forcible compression of the relevant switch pressure responsive means.

The covering of nozzle 34a by the cam face 48 with attendant blockage of the former will not, under these conditions wherein fluid directing member 28 has been switched to connect valve inlet port 22 and valve outlet port 26, result in the formulaton and application of a control signal input to bistable fluidic element 16a on control signal input conduit 52a because branch conduit 82 and connecting conduit 84a are no longer being supplied with pressurized fluid and are, in any event, being vented to atmosphere through valve vent means 25.

The continued counterclockwise rotation of cams 42 and 44 to momentarily cover and block in turn nozzles 36c and 34c, and 36b and 34b will be effective to in turn shift bistable fluidic elements 16c and 16b from the respective states thereof wherein control signal outputs are provided therefrom on control signal output conduits 58c and 58b with attendant venting to atmosphere of the control signal output conduits 56c and 56b.

This switching of bistable fluidic element 16c will of course be effected by the formulation and application of a control signal input thereto on control signal input conduit 54c attendant the blockage of nozzle 36c and resultant pulse formulation in connecting conduit 88c; while the described switching of bistable fluidic element 16b will of course be effected by the formulation and application of a control signal input thereto on control signal input conduit 54b attendant the blockage of nozzle 36b and resultant pulse formation in connecting conduit 88b. As described hereinabove with regard to the blockage of nozzle 34a by cam face 48 under these conditions wherein valve control solenoid 30 is energized and branch conduit 82 resultantly de-pressurized, it is believed clear that the blockage of nozzles 34c and 34b by cam face 48 attendant the completion of one revolution by the crankshaft 40 will be totally ineffective in the formulation or application of control signal inputs to bistable fluidic elements 16c and 16b on the respective control signal input conduits 52c and 52b.

Operation of the fluid machine 38 under loaded conditions would continue as above with each revolution of the crankshaft 40 and cams 42 and 44 functioning to provide sequential, control signal inputs to the bistable fluidic elements 16a, 16c and 16b, on control signal input conduits 54a, 54b and 54c and the overall effect of system operation being to positively maintain the loading of the fluid machine 38.

Once conditions dictating the unloading of the fluid machine 38 are sensed by condition responsive switch means 108, it may be understood that the same would immediately re-open to de-energize valve control solenoid 30 with attendant return of the fluid directing member 28 to the depicted position thereof to connect valve inlet port 22 to valve outlet port 24 to re-commence the supply of pressurized fluid to branch conduit 82, while terminating such supply to branch conduit 86 and again venting the latter to atmosphere through valve vent means 27.

Under these conditions, operation of the unloader valve control system would be substantially as initially described hereinabove with the first complete revolution of the crankshaft 40 and cams 42 and 44 functioning to sequentially provide different control signal inputs to the respective bistable fluidic elements—with the order of such sequential provision being determined in part by the disposition of the cams 42 and 44 relative to the respective nozzle pairs at the time branch conduit 82 is effectively re-pressurized as should be obvious—to sequentially switch the latter to open the respective fluidically controlled electrical switches and effect sequential de-energization of the respective unloader valve control solenoids with attendant unloading of the fluid machine cylinders. More specifically, and assuming this effective re-pressurization of branch conduit 82 to occur while cams 42 and 44 are rotating through a position intermediate nozzle pairs 34c and 36c, and nozzle pair 34b and 36b, control signal inputs would be sequentially provided on control signal inputs 52b, 52a and 52c, respectively, to sequentially switch bistable fluidic elements 16b, 16a and 16c to respectively provide control signal outputs on control signal output conduits 56b, 56a and 56c attendant the first complete revolution of the crankshaft 40 and cams 42 and 44 back to the said position thereof.

In each instance, that is to say whether considering the initial control signal inputs which effect bistable fluidic element switching, or the continuing control signal inputs which may be said to contribute to the positive state maintenance of the respective bistable fluidic elements in the absence of operation of the condition responsive switch 108, it may be understood that the duration of such control signal inputs will be determined by the duration of the pulses generated by the cam-effected nozzle blockages. As such, it is believed clear that the optimum durations for such control signal inputs as determined by the operating characteristics of the particular bistable fluidic elements which are utilized may readily be provided for by proper choice of the relevant design parameters including angular cam face velocity and accurate extent, effective nozzle diameter and the pressure of the fluid in branch conduits 74 and 78.

Regarding the sequence of operation to be provided, it is believed clear that some variation may be provided therein by re-arrangement of the conduit connections between the respective nozzle pairs and bistable fluidic elements.

The particular advantage provided by the somewhat advanced position of cam 42—which, as is now believed clear, may be referred to as the "load" cam—relative to cam 44 is somewhat analogous to that provided for by spark advance in the ignition system of an internal combustion engine. More specifically, it may be understood that for reciprocating fluid machines in the nature of pumps or compressors, it is most desirable from the point of view of maximum fluid machine efficiency that the loading of each of the cylinders thereof be commenced right at the beginning of the suction stroke. Thus, although the response time of the unloader valve control system of the invention is extremely short, the said time may nonetheless be compensated for upon fluid machine loading by advancing the "load" cam 42 to an extent that will commence which may be termed "load" control signal formulation by a time preceding the commencement of the relevant fluid machine cylinder suction stroke which is equal to the overall response time of the system. By this arrangement, and realizing of course that the placement of the respective nozzles 36a, 36c and 36b in the nozzle block 32, and the orientation of the cam 42 relative to the fluid machine crankshaft 40, are determined at least in part by the orientation of the crankshaft 40 relative to the nozzle block 32 at the commencement of the suction stroke in each of the respective fluid machine cylinders, it may be understood that loading of the respective fluid machine cylinders may be provided for at the exact commencement of the respective suction strokes therein to thus maximize fluid machine efficiency therefor.

Of additional interest with regard to cams 42 and 44 is the fact that although two separate cams are disclosed, it is believed clear that a single cam incorporating cam faces 46 and 48 could be substituted therefor. Although an obvious advantage of dual face, single cam utilization would reside in greater system simplicity, it may be understood that the same would, of course, preclude adjustment of the extent of advance of cam face 46 relative to cam face 48, which adjustment could prove desirable, for example, for test purposes or in adapating the unloader valve control system of the invention for use with fluid machines having differing numbers of cylinders or working spaces.

By the above is believed made clear that there is provided by this invention a new and improved unloader valve control system which, in full accordance with the stated objects thereof, embodies an extremely fast response time, significant versatility, somewhat reduced complexity and one which is satisfactorily and reliably operable for long periods of time under demanding operational conditions.

More specifically, with regard to the response time of the system, it may be noted that the same has been determined by carefully conducted test applications thereof to be in the range of 28 to 30 ms., as compared to the response times of 75 to 100 ms. which are characteristic of the best currently available unloader valve control systems of the prior art, to thus make clear that significant increase in the speed of operation of the fluid machine controlled by the system of the invention, with attendant significant increase in the amount of useful work performed thereby per unit of fluid machine operating time, is made possible. Of interest is the fact that this significant reduction in system response time is believed attributable primarily to a response time in the order of 1 ms. for the respective bistable fluidic elements.

With regard to the versatility of the system of the invention, it may be understood that the simple change of the nozzle block with commensurate change in the number of bistable fluidic elements and fluidically controlled electrical switches will suffice for applications to fluid machines having different numbers of cylinders. More specifically, were it desired to modify the system of FIGURE 1 for use with a pump or compressor having six cylinders, it may be understood that nozzle block 32 would be changed to one having six equally spaced nozzle pairs, and that three additional bistable fluidic elements and fluidically controlled electrically switches would be cooperatively associated with the additional three nozzle pairs, and with the three additional unloader valve control solenoids, all as described for the depicted bistable fluidic elements and fluidically controlled switches, to substantially complete the system modification procedure.

This modification procedure is believed to stand very well in comparison to some of the best unloader valve control systems of the prior art wherein a careful machined housing containing a separate, and equally carefully machined plunger for each of the fluid machine cylinder unloaders is required, and wherein utilization with a fluid machine having a different number of cylinders necessitates the replacement of the entire housing—plunger assembly with one having a number of plungers commensurate with the said different number of fluid machine cylinders.

With regard to the somewhat reduced complexity of the system of the invention, it may be understood that two of the four major components thereof are of extremely simple construction. More specifically it is believed clear that the respective bistable fluidic elements are completely devoid of moving parts while the nozzle block and associated cams are indeed of simple mechanical construction.

With regard to the reliability of the system of the invention under demanding operational conditions, it may be understood that each of the major components thereof is or soon will be of basically "off-the-shelf" design and construction and has, as such, demonstrated significant reliability under long periods of demanding usage.

Despite the significant reliability inherent in the design, construction and manner of operation of the system of the invention, the same does embody certain "fail-safe" features which, in the unlikely event of a major component failure and/or in the event of a failure in electrical power or pressurized fluid supply, could function to prevent damage to the fluid machine 38 by rapidly shifting or maintaining the latter to or in the unloaded condition thereof. More specifically, in the event of failure in the electrical power supply to the system, it may be understood that the unloader valve control solenoids would immediately be de-energized, or thusly maintained as the case may be, to insure unloaded operation of the fluid machine 38 until such failure were remedied. In addition, and as discussed hereinabove, with the respective bistable fluidic elements 16a, 16b and 16c being of the "preferred" type to initially provide control signal outputs upon control signal output conduits 56a, 56b and 56c upon the application of power signal inputs thereto, it may be understood that operation of the fluid machine 38 will always commence with the latter unloaded, and that any initial failure in the control signal generation means of sufficient extent to preclude the generation of any control signal inputs would result only in the continued, unloaded operation of the fluid machine 38 until such time as the failure had been detected and remedied. It is, of course, believed clear that such "fail-safe" provisions would be of particular importance with regard to system utilization with reciprocating pumps wherein the substantially incompressible nature of the fluid being worked could effect substantial fluid machine destruction as a result of improperly timed fluid machine loading.

DETAILED DESCRIPTION OF THE INVENTION AS APPLIED TO A VERTICAL PLUNGER TYPE RECIPROCATING PUMP

Referring now to FIGURES 2 through 5, the same may be understood to depict a specific application of the unloader valve control system of the invention, as described in detail hereinabove with regard to FIGURE 1, to a reciprocating, vertical plunger type pump in the nature of those manufactured and marketed by applicant's assignee, the Worthington Corporation, under the model designations "VTE 1" and "VTE 2." Where applicable, it may be understood that the same reference numeral indicia, and/ or the same or progressively similar reference numeral and letter suffix indicia, utilized in the indentification of the system components attendant the description of the system of FIGURE 1, will be utilized in the identification of the same and/or the additionally similar system components attendant the description of FIGURES 2 through 5.

Referring now to FIGURE 2, the system of the invention is disposed within a housing 120 which includes a housing cover 122 removably secured thereto by attachment screws 124 and vent means 126 formed in said housing cover for obvious purpose.

Attachment means in the nature of tapped bores 128 are provided for attachment of the housing 120 to the forward end of a vertical plunger type pump and a stepped, pump crankshaft extension 40 extends as shown through a generally central bore 132 provided therein in the housing 120 and is journalled and maintained therein by roller bearings 134 and 136, and retainer clips 138 and 140, respectively. The crankshaft extension 40 is splined as indicated at 142 for fixed attachment to the pump crankshaft so as to be rotatable with the latter.

An interior mounting flange 144 is provided in the housing 120 and the nozzle block 32 is secured thereto by attachment screws 146 which extend as shown through oversize bores 148 provided therefor in the said nozzle block into tapped bores provided therefor in the said mounting flange. The attachment screws bear as shown on lockwashers 150 against the outer face of the nozzle block 32 to retain the same in position, it being understood that the oversize bores will enable slight adjustment of the position of the said nozzle block relative to the mounting flange 144. For purposes described in greater detail hereinbelow, the attachment screws 146 include sleeve-like attachment members 152.

For utilization as illustrated by FIGURES 2 through 5, it may be understood that all of the bistable fluidic elements of the system would be encapsulated in module form as indicated generally at 154, and that such bistable fluidic element module would include portions at least of the respective connecting conduits, the power signal input conduits, and the control signal input and output conduits as described in detail hereinabove with regard to FIGURE 1.

Although not per se forming any part of this invention, it may be understood that the bistable fluidic element module 154 would be constituted by a plurality of plates having suitable cavities formed therein and effective to provide the requisite bistable fluidic element and associated conduit shapes upon appropriate placement of the said plates together in surface-to-surface, sandwich-like relationship. For system utilization as depicted in FIGURES 2 through 5, a suitable bistable fluidic element module is currently manufactured to the specifications of applicant's assignee, the Worthington Corporation, by the Aviation Electric Company, Ltd. of Montreal, Canada.

A support ring 156 is supported and spaced as shown from the bistable fluidic element module 154 by attachment screws 158 and 160, and spacer ring 162, respectively. The support ring 156 functions in turn to support the respective fluidically controlled, electrical switches from the circumference thereof in a generally circular array in the manner best seen in FIGURE 3.

Briefly described, and assuming the said switches to be of the positive action, double acting type referred to hereinabove and depicted in some detail at 18a in FIGURES 2 and 3, reference to the latter will reveal the switch to comprise a stator 166 which is fixedly secured to the support ring 156 by the passage of stator tabs 168 through slots in the latter and subsequent tab bending. A movable actuator arm assembly is indicated at 170 and is pivotally mounted as indicated at 172 with regard to the stator 166. First and second expansible chamber means which take the form of diaphragm assemblies as indicated at 174 and 176 are disposed as shown between the stator 166 and actuator arm assembly 170.

An electrical switch which may, for example, take the form of a microswitch is indicated at 178 and is supported as shown from the stator 166 by a support bracket 180. The microswitch 178 includes the usual switch actuator 184 which is disposed as shown within the path of movement of a switch actuator 182 carried from the outer surface of the diaphragm assembly 176.

In operation, and with a pressurized fluid input to diaphragm assembly 176, as provided by a control signal output on control signal output conduit 58c as seen in FIGURE 1, and with diaphragm assembly 174 vented to atmosphere through control signal output conduit 56c and vent means 60c, again as seen in FIGURE 1, it may be understood that diaphragm assembly 176 will be expanded and diaphragm assembly 174 forcibly contracted by actuator arm assembly 170 with the result that switch actuator 182 will be moved to abut switch 178 and positively maintain the same in the closed position thereof until such time as a change is effected in the relative conditions of the respective diaphragm assemblies. Conversely, with a pressurized fluid input to diaphragm assembly 174 as provided by a control signal output on control signal output conduit 56c as seen in FIGURE 1, and with diaphragm assembly 176 vented to atmosphere through control signal output conduit 58c and vent means 62c, again as seen in FIGURE 1, it may be understood that diaphragm assembly 174 will be expanded and diaphragm assembly 176 forcibly contracted by actuator arm assembly 170 with the result that switch actuator 182 will be moved and positively maintained out of abutment with switch actuator 184 to enable re-opening of the switch 178 and insure the maintenance thereof in the open condition until a change is again effected in the relative conditions of the respective diaphragm assemblies. It is believed clear that, as depicted in FIGURE 3, it is the microswitch 178 of the fluidically controlled, electrical switch 18c which would be effective to energize said solenoid and vice versa.

Figure 3:
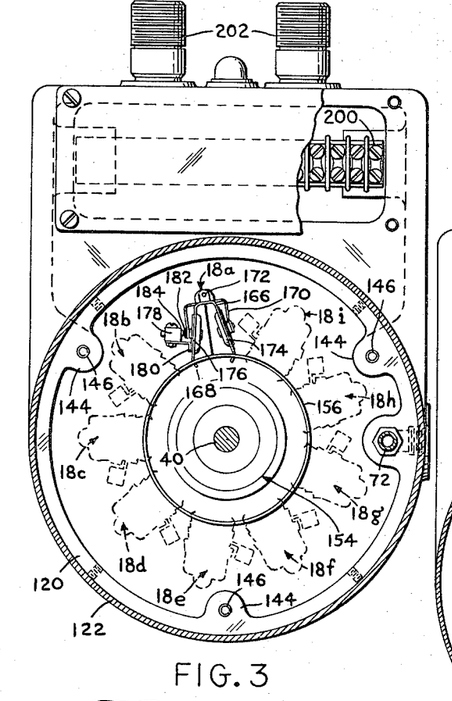
FIGURE 3 is a cross-sectional view taken on line 3—3 in FIGURE 2.
Figure 4:
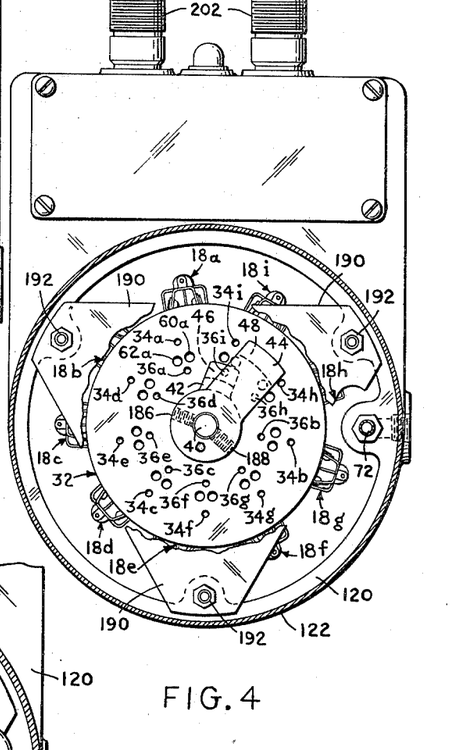
FIGURE 4 is a cross-sectional view taken on line 4—4 in FIGURE 2.
Figure 5:
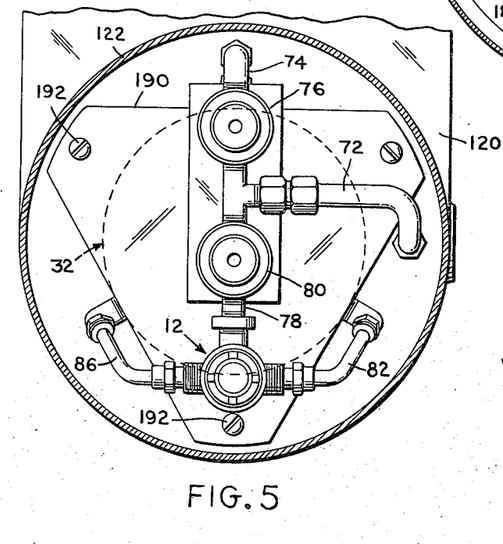
FIGURE 5 is a cross-sectional view taken on line 5—5 in FIGURE 2.

As depicted in FIGURE 3, the system of the invention may be seen to include nine positive action fluidically controlled electrical switches as indicated at 18a through 18i, respectively, and it may be understood that with this switch configuration, a bistable fluidic element module 154 containing nine complete and distinct bistable fluidic elements, and a nozzle plate 32 containing nine distinct nozzle pairs as depicted in FIGURE 4 and described in greater detail hereinbelow, the system of the invention would be applicable, completely without major component change, to the control of vertical plunger type pumps having three, six or nine cylinders through the simple expedient of the operative connection of only that number of the respective bistable fluidic elements and a fluidically controlled electrical switch means commensurate with the number of pump cylinders to the respective pump cylinder unloader valve control solenoids.

Referring again to FIGURE 2, the crankshaft extension 40 may be seen to extend with freedom for rotation through aligned bores provided therefor in the respective bistable fluidic element module 154 and the nozzle block 32. The respective cams 42 and 44, comprising the cam faces 46 and 48 formed as depicted, are affixed as shown by set screws 186 and 188 to the protruding portion of the crankshaft extension 40 so as to be rotatable therewith while being readily adjustable relative thereto upon the loosening of the said set screws.

A support plate 190 is supported as shown from the generally sleeve-like attachment members 152 by the passage of attachment screws 192 therebetween as shown, and the said support plate may be seen to be effective in turn to support the respective multi-position valve means 12, and the pressure regulator means 80 and 76 therefrom along with the respective supply and branch conduits as indicated.

An electrical terminal assembly is indicated at 200 and electrical connectors at 202 for utilization in the suitable connection of the lines from the respective fluidically controlled electrical switches to the non-illustrated pump unloader valve control solenoids. More specifically, and as illustrated in FIGURE 2 for line 94 from fluidically controlled, electrical switch 18a, it may be seen that the said line extends from the said switch for connection to the terminal assembly 200, and that a line 204 extends from the latter for connection to the electrical connectors 202.

Referring now to FIGURE 4, it may be seen that the nozzle block 32, as utilized in this form of the system of the invention, comprises an outer group of nine, substantially equally spaced nozzles as indicated at 34a through 34i, respectively, and an inner group of nine, generally aligned and substantially equally spaced nozzles as indicated at 36a through 36i, respectively, to accordingly result in the formation of nine distinct nozzle pairs as should be obvious.

As discussed hereinabove, it may be understood that the provision of these nine, substantially equally spaced nozzle pairs, and the provision of the nine fluidically controlled electrical switches as indicated at 18a through 18i, respectively in FIGURES 3 and 4, taken in conjunction with the provision of a bistable fluidic element module 154 (FIGURE 2) including nine distinct, bistaable fluidic elements, render the system of the invention as depicted in FIGURES 2 through 5 adaptable for use in the control of a vertical plunger type pump having nine or a lesser member of cylinders.

Despite the fact that the utilization of nine distinct pairs of nozzles requires that the angular spacing therebetween be substantially reduced as compared to the angular spacing provide between the three distinct nozzle pairs as seen in FIGURE 1, it is believed clear that one complete revolution of the crankshaft extension 40 and cams 42 and 44 will nonetheless suffice for the generation of the fluidic control signals required to effect the loading or unloading of the associated pump. More specifically, and taking the nozzles 34a through 34i of the outer nozzle group for example, if it is assumed that the fluid directing member 28 (FIGURE 1) of the multi-position valve means 12 has just been shifted to the depicted position thereof to connect valve inlet port 22 and valve outlet port 24 with attendant supply of pressurized fluid to the branch line 82, it is believed clear that the subsequent complete revolution of the cam face 48 around the face of the nozzle block 32 will suffice to effect the generation of all of the fluidic control signals required to the unloading of all nine of the pump cylinders.

As constructed for use in the manner depicted in FIGURES 2 through 5, it may be understood that the respective fluidic element vent means would be provided for by vent nozzles in the face of the nozzle block 32. More specifically, and as described and identified in detail only for vent means 60a and 62a of fluidic element 16a, FIGURE 4 makes clear that the said vent means would be formed by suitably identified nozzles disposed as shown in the said nozzle block face intermediate the respective nozzles 34a and 36a.

Many modifications of the disclosed embodiments of the system of the invention, other and different than those discussed specifically hereinabove, may of course be made by those skilled in this art without departing from the spirit and scope of this invention as defined in the appended claims.

What is claimed is:

1. In a fluidically controlled, electrically operated unloader valve control system for use with a supply of fluid in the control of the unloader valves of a fluid machine in response to the operation of fluid machine condition responsive means which determine when fluid machine loading and unloading are to take place, the improvements comprising, fluidic control signal generation means including, fluid directing means cooperatively associated with said fluid machine condition responsive means and operable thereby to direct said supply fluid in a first path to load said fluid machine and to direct said supply fluid in a second path to unload said fluid machine, fluidic control signal formulation means cooperatively associated with said fluid directing means and operative, in response to the operation of said fluid machine, to formulate first fluidic control signals when said supply fluid is directed in said first path and to formulate second fluidic control signals when said supply fluid is directed in said second path, fluidically controlled electrical switch means cooperatively associated with the unloader valves of said fluid machine and operative, in response to said first fluidic control signals, to effect the loading of said fluid machine and operative, in response to said second fluidic control signals, to effect the unloading of said fluid machine, and means to apply said fluidic control signals to said fluidically controlled, electrical switch means.

2. In a fluidically controlled, electrically operated unloader valve control system as in claim 1 wherein, said fluid machine comprises a rotatable operating shaft and wherein said fluidic control signal formulation means are operative in response to the rotation of said shaft.

3. In a fluidically controlled, electrically operated unloader valve control system as in claim 2 wherein, said fluidic control signal formulation means comprise means normally venting said first and second fluid paths, and means operable in accordance with the rotation of said shaft to periodically block said venting means to respectively formulate said first and second fluidic control signals in said first and second paths.

4. In a fluidically controlled, electrically operated unloader valve control system as in claim 3 wherein, said means normally venting said first and second fluid paths comprise nozzle block means having spaced nozzles formed in a face thereof and effective to vent said first and second fluid paths, and said means to periodically block said venting means comprise cam means which are rotatable with said fluid machine operating shaft to sweep the relevant face of said nozzle block means to periodically block said nozzles.

5. In a fluidically controlled, electrically operated unloader valve control system as in claim 4 wherein, said first and second fluid paths each comprise a plurality of branch paths, said nozzle block comprises a first group of spaced nozzles each of which is effective to vent a different one of the branch paths of said first fluid path and a second group of spaced nozzles each of which is effective to vent a different one of the branch paths of said second fluid path, and said cam means comprise a first cam face which is operative to periodically block the respective nozzles of said first nozzle group to formulate fluidic control signals in the respective branch paths of said first fluid path which are normally vented thereby, and a second cam face which is operative to periodically block the respective nozzles of said second nozzle group to formulate fluidic control signals in the respective branch paths of said second fluid path which are normally vented thereby.

6. In a fluidically controlled, electrically operated unloader valve control system as in claim 5 wherein, said nozzles of said first nozzle group and said nozzles of said second nozzle group are respectively disposed in generally circular arrays in said nozzle block face and said cam means are effective to make a complete sweep of said nozzble block face for each revolution of said fluid machine operating shaft whereby, all of said nozzles will be blocked once for each revolution of said shaft.

7. In a fluidically controlled, electrically operated unloader valve control system as in claim 6 wherein, said respective, generally circular nozzle arrays are arranged in spaced, generally concentric manner in the face of said nozzle block, and said nozzles are further arranged in substantially equally spaced nozzle pairs each of which includes a nozzle from said first group and a nozzle from said second group, respectively.

8. In a fluidically controlled, electrically operated unloader valve control system as in claim 7 wherein, the disposition of said first cam face relative to the nozzles of said first nozzle group is somewhat advanced relative to the disposition of said second cam face relative to the nozzles of said second nozzle group whereby, the blockage of the nozzles of said first nozzle group and attendant formulation of fluidic control signals in the respective branch paths of said first fluid path will be somewhat advanced relative to the blockage of the nozzles of said second nozzle group and attendant formulation of fluidic control signals in the respective branch paths of said second fluid path.

9. In a fluidically controlled, electrically operated unloader valve control system as in claim 7 wherein, said fluid machine comprises a plurality of unloader valves, and said fluidically controlled electrical switch means comprise a plurality of fluidically controlled electrical switches with each of the latter being operative in response to the first and second fluidic control signals formulated in different branch paths of said first and second fluid paths attendant the blockage of the respective nozzles of a different nozzle pair, to control the operation of a different one of said fluid machine unloaded valves.

10. In a fluidically controlled, electrically operated unloader valve control system as in claim 1 wherein, said means to apply said fluidic control signals to said fluidically controlled electrical switch means comprise bistable fluidic element amplifier means which are connected in said system intermediate said fluidic control signal generation means and said fluidically controlled electrical switch means and are operative to amplify said fluidic control signals formulated in said first and second fluid paths for application to said fluidically controlled electrical switch means.

11. In a fluidically controlled, electrically operated unloader valve control system as in claim 4 wherein, said means to apply said fluidic control signals to said fluidically controlled electrical switch means comprise bistable fluidic element amplifier means which are connected in said system intermediate said fluidic control signal generation means and said fluidically controlled electrical switch means and are operative to amplify said fluidic control signals formulated in said first and second fluid paths for application to said fluidically controlled electrical switch means.

12. In a fluidically controlled, electrically operated unloader valve control system as in claim 6 wherein, said means to apply said fluidic control signals to said fluidically controlled electrical switch means comprise bistable fluidic element amplifier means which are connected in said system intermediate said fluidic control signal generation means and said fluidically controlled electrical switch means and are operative to amplify said fluidic control signals formulated in said first and second fluid paths for application to said fluidically controlled electrical switch means.

13. In a fluidically controlled, electrically operated unloader valve control system as in claim 9 wherein, said means to apply said fluidic control signals to said fluidically controlled electrical switch means comprise a bistable fluidic element amplifier connected in said system intermediate each of said fluidically controlled electrical switches and said fluidic control signal generation means, with each of said bistable fluidic elements being operative to amplify the fluidic control signals formulated in different branch paths of said first and second fluid paths for application to a different one of said fluidically controlled electrical switch means.

14. In a fluidically controlled, electrically operated unloader valve control system as in claim 3 wherein, said fluid directing means comprise additional venting means operative to vent said first fluid path only when said supply fluid is directed in said second fluid path, and operative to vent said second fluid path only when said supply fluid is directed in said first fluid path to thereby inhibit the formulation of control signals in a fluid path to which supply fluid is not at that time being directed.

15. In a fluidically controlled, electrically operated unloader valve control system as in claim 5 wherein, said fluid directing means comprise additional venting means operative to vent said first fluid path only when said supply fluid is directed in said second fluid path, and operative to vent said second fluid path only when said supply fluid is directed in said first fluid path to thereby inhibit the formulation of control signals in a fluid path to which supply fluid is not at that time being directed.

16. In a fluidically controlled, electrically operated unloader valve control system as in claim 9 wherein, said fluid directing means comprise additional venting means operative to vent said first fluid path only when said supply fluid is directed in said second fluid path, and operative to vent said second fluid path only when said supply fluid is directed in said first fluid path to thereby inhibit the formulation of control signals in a fluid path to which supply fluid is not at that time being directed.

17. In a fluidically controlled, electrically operated unloader valve control system as in claim 13 wherein, said fluid directing means comprise additional venting means operative to vent said first fluid path only when said supply fluid is directed in said second fluid path, and operative to vent said second fluid path only when said supply fluid is directed in said first fluid path to thereby inhibit the formulation of control signals in a fluid path to which supply fluid is not at that time being directed.

References Cited

UNITED STATES PATENTS

| | | | |
|---|---|---|---|
| 2,727,525 | 12/1955 | Harris | 137—83 |
| 3,039,393 | 6/1962 | Yaindl | 103—40 |
| 3,124,999 | 3/1964 | Woodward. | |
| 3,357,441 | 12/1967 | Adams. | |
| 3,366,062 | 1/1968 | Kelsey. | |
| 3,429,248 | 2/1969 | Furlong. | |

WILLIAM L. FREEH, Primary Examiner

U.S. Cl. X.R.
103—40; 137—81.5